United States Patent [19]
Chatani et al.

[11] Patent Number: 5,113,452
[45] Date of Patent: May 12, 1992

[54] HAND-WRITTEN CHARACTER RECOGNITION APPARATUS AND METHOD

[75] Inventors: Masayuki Chatani; Kimiyoshi Yoshida, both of Kanagawa; Akio Sakano, Ibaraki; Hirofumi Tamori, Tokyo, all of Japan

[73] Assignee: Sony Corporation, Tokyo, Japan

[21] Appl. No.: 395,740

[22] Filed: Aug. 18, 1989

[30] Foreign Application Priority Data

Aug. 23, 1988 [JP] Japan ................. 63-209094

[51] Int. Cl.⁵ ............................................ G06K 9/18
[52] U.S. Cl. .......................................... 382/13; 382/9
[58] Field of Search ............ 382/9, 13, 30, 34, 24, 382/22, 38

[56] References Cited

U.S. PATENT DOCUMENTS

| | | | |
|---|---|---|---|
| 4,045,773 | 8/1977 | Kadota et al. | 382/9 |
| 4,162,482 | 7/1979 | Su | 382/55 |
| 4,193,056 | 3/1980 | Morita et al. | 382/20 |
| 4,284,975 | 3/1981 | Odaka et al. | 382/13 |
| 4,317,109 | 2/1982 | Odaka et al. | 382/13 |
| 4,377,803 | 3/1983 | Lotspiech | 382/9 |
| 4,527,283 | 7/1985 | Ito et al. | 382/9 |
| 4,607,385 | 8/1986 | Maeda | 382/9 |
| 4,653,107 | 3/1987 | Saojima et al. | 382/13 |
| 4,654,873 | 3/1987 | Fujisawa | 382/9 |
| 4,850,025 | 7/1989 | Abe | 382/9 |

FOREIGN PATENT DOCUMENTS

0166271  2/1986  European Pat. Off. .
WO80/02761 12/1980  PCT Int'l Appl. .
1144319  3/1969  United Kingdom .

Primary Examiner—David K. Moore
Assistant Examiner—Yon Jung
Attorney, Agent, or Firm—Philip M. Shaw, Jr.

[57] ABSTRACT

A hand-written character recognition apparatus and method in which line element data obtained from an output hand-written stroke is converted to a plurality of sub-strokes satisfying a tracing condition in accordance with a tracing command described in a character dictionary data base, substrokes satisfying the tracing condition are selected in accordance with a selection command described in the character dictionary data base, then on the basis of an assumption that the hand-written stroke is a set of sub-strokes, the hand-written character is recognized by evaluating the shape of the sub-stroke by employing a shape evaluation command and by evaluating a position evaluation command derived from the character dictionary data base, whereby a hand-written character, such as a distorted hand-written character and so on, can be recognized with ease.

8 Claims, 6 Drawing Sheets

HAND-WRITTEN CHARACTER RECOGNITION APPARATUS AND METHOD

BACKGROUND OF THE INVENTION

The present invention relates generally to a character recognition apparatus and method and more particularly to an on-line hand-written character recognition apparatus and method capable of recognizing a hand-written character such as a distorted hand-written character and the like.

DESCRIPTION OF THE PRIOR ART

A known hand-written character recognition method operates according to a rule in which shapes of a single hand-written stroke are sorted to several tens of typical shapes (fundamental strokes) and the shape of a character is described as the combination of the above-mentioned typical shapes. This is called a templet matching method.

The templet hand-written character recognition method requires the preparation of many rules and kinds of fundamental strokes in order to cope with the possible deformations of hand-written characters such as continuously written characters, distorted hand-written characters and the like, which require a large amount of time to recognize and a large volume, character dictionary data base.

Also according to this known hand-written character recognition method, the users are forced to adhere to specific writing conditions such as the number of strokes and the writing order of a hand-written character. It is frequently observed that these writing conditions annoy the users and it is therefore desired to alleviate the writing conditions.

OBJECTS AND SUMMARY OF THE INVENTION

It is a general object of the present invention to provide an improved hand-written character recognition apparatus which can remove the above-mentioned defects encountered with the prior art.

More specifically, it is an object of the present invention to provide a hand-written character recognition apparatus which is powerful in the recognition of distorted hand-written characters.

It is another object of the present invention to provide a hand-written character recognition apparatus which can recognize a hand-written character in a relatively short time.

It is still another object of the present invention to provide a hand-written character recognition apparatus based on a line element data tracing process and which is suitable for recognizing hand-written characters and symbols having many distorted portions.

According to an aspect of the present invention, there is provided a hand-written character recognition apparatus, and a corresponding method of its operation, comprising means for receiving dot obtained when writing a character and for generating corresponding line element data therefrom and character dictionary data base means which stores character data as command instruction sets each expressing the configuration of a different character, the character data including tracing commands for extracting sub-stroke data from the line element data, sub-stroke data selecting commands for selecting one or more sub-stroke data for later evaluation processing, and checking commands for partially evaluating the thus selected one or more sub-stroke data by making a comparison to a partial shape of a standard character, and for totally evaluating the hand-written character by comparing it to the standard character.

Further included are sub-stroke data generating means connected to the character dictionary data base means for receiving the tracing commands and generating sub-stroke data by tracing the line element data based on the tracing commands inherent to each standard character derived from the character dictionary data base means and sub-stroke data selecting means connected to the character dictionary data base means for receiving the character selection commands and supplied with the thus generated sub-stroke data for selecting sub-stroke data inherent to each standard character based on the sub-stroke data selecting commands. Sub-stroke data evaluating means connected to the character dictionary data base means, so as to receive character checking commands, and the sub-stroke data selecting means evaluates the partial similarity of the selected sub-stroke data compared to a partial sub-stroke data of the standard character, and evaluates the total similarity of the hand-written character compared to the shape of the standard character based on the results of the evaluation of the partial similarity.

DETAILED DESCRIPTION OF A PREFERRED EMBODIMENT

An embodiment of a hand-written character recognition apparatus according to the present invention will hereinafter be described with reference to the attached drawings.

Figure 1:
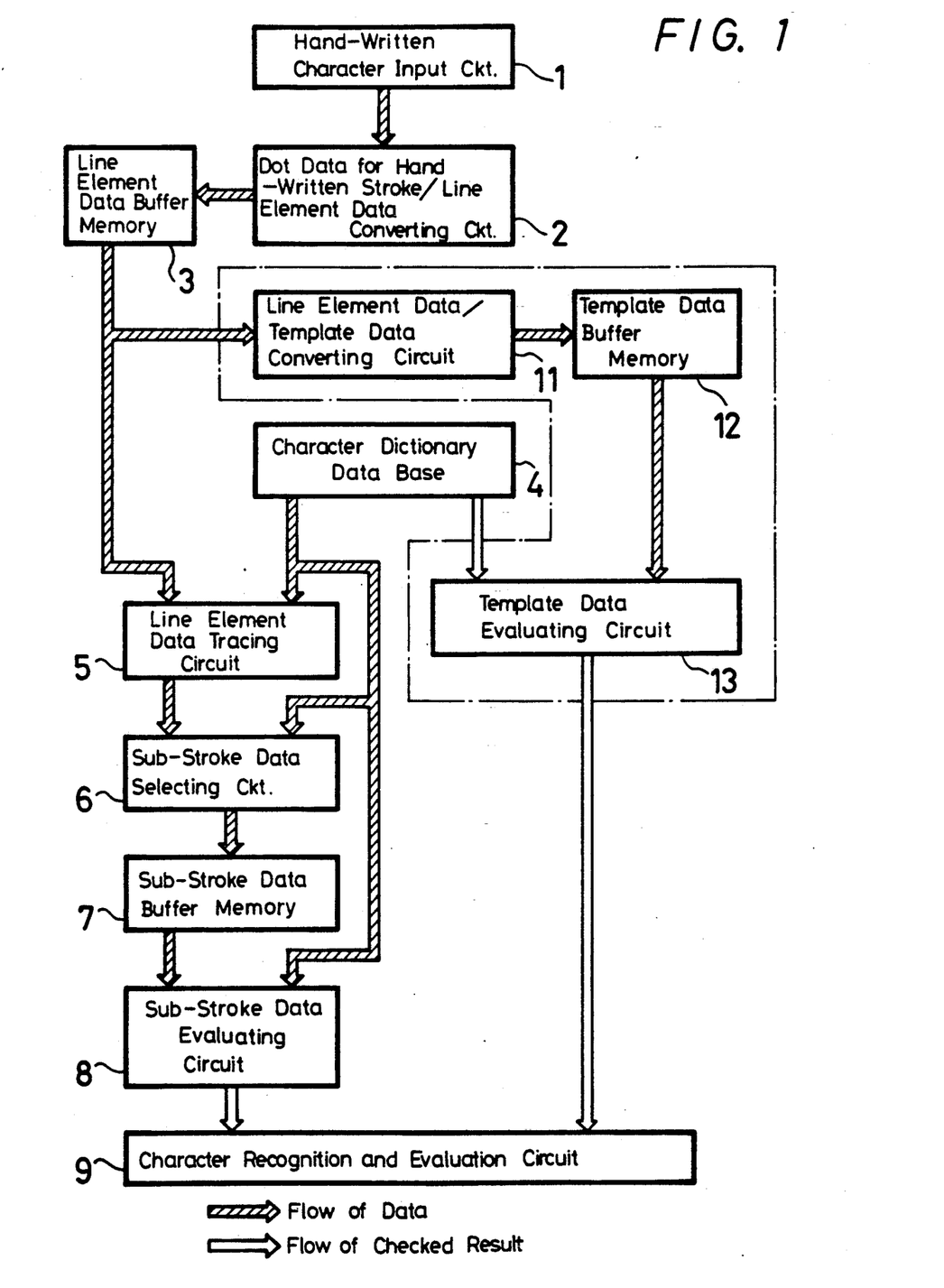
FIG. 1 is a diagram of the operational functional blocks managed by an embodiment of a hand-written character recognition apparatus according to the present invention.

FIG. 1 shows an overall arrangement of an embodiment of a hand-written character recognition apparatus according to the present invention.

A hand-written character input circuit 1 converts a hand-written stroke to dot data. Though not shown, the hand-written character input circuit 1 includes a data tablet having a tablet pen in which a character is written within a square writing area defined on the data tablet by the tablet pen.

The dot data for the hand-written stroke derived from the hand-written character input circuit 1 is converted to line element data by a dot data for hand-written stroke/line element data converting circuit 2 under predetermined conditions and is then fed to a line element data buffer memory 3. In this case, the dot data for the hand-written stroke is the data representing coordinate values at specific sampling points and the line element data is the time sequential data of the hand-written stroke which have data elements such as length, direction, starting point coordinates and the like.

Figures 6A, 6B:
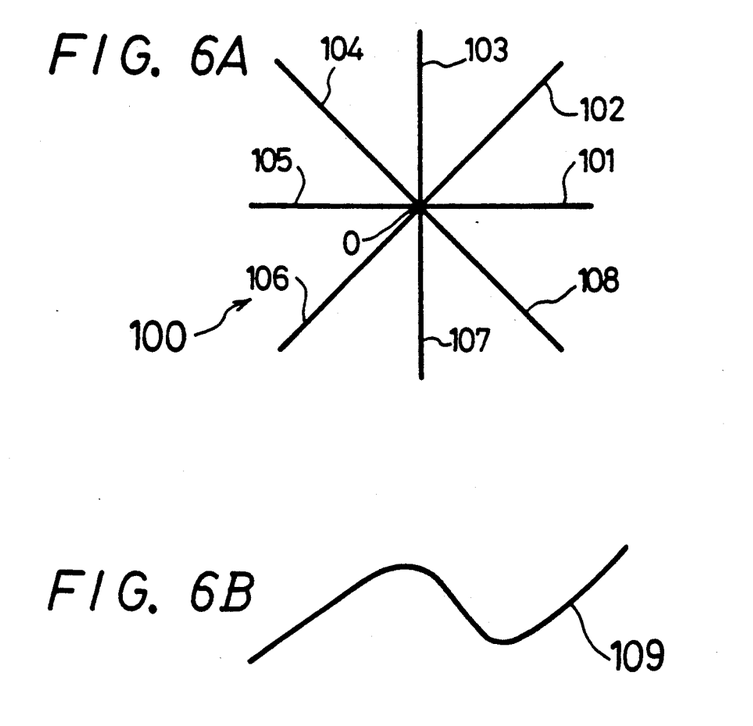
FIGS. 6A to 6D are diagrams for use in explaining the conversion of a hand-written stroke to line element data.

Referring to FIGS. 6A to 6D, this process will now be explained in greater detail. As illustrated in FIG. 6A, the data tablet of the input circuit 1 includes eight quantization grids 101 to 108, inclusive, which are arranged as radially extending lines, spaced at regular angular intervals, from a common point of origin 0. It should be understood that a greater number of lines could be used with better results, e.g. 16 lines.

Figure 6C:
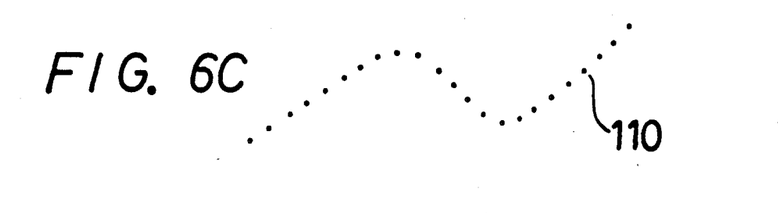

Assuming that the stroke of the data tablet pen or stylus writes a stroke 109, as shown in FIG. 6B, then wherever the stroke crosses one of the grids a dot signal will be produced with known coordinates, thereby producing a data stream 110 of dot coordinates as shown in FIG. 6C.

Figure 6D:
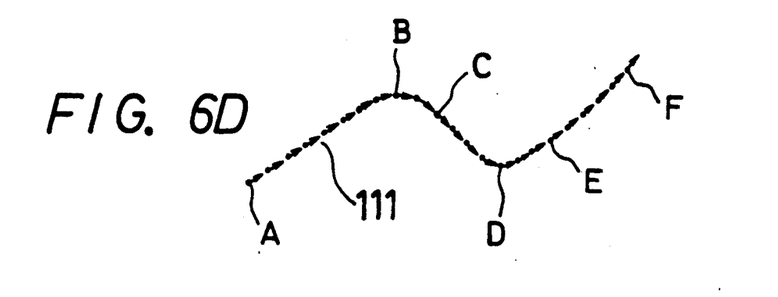

Referring now to FIG. 6D, the input stroke dot data is analyzed in the following manner by the circuit 2. At first, the origin 0 of the grid 100 is placed on a pen-down point A, and then the dot data is sequentially checked to determine if the differential value of the stroke at any point indicates that its slope is the same as one of the grid lines 101 to 108, inclusive, i.e. whether or not the stroke at that point is parallel with one of the grid lines. In the example given, at point B the differential value indicates parallelism with grid line 101, and accordingly, the line segment from A to B is recognized as one line element data.

Then the circuit 2 mathematically places the origin of the grid 100 on the point B and continues the checking process. Thereafter, at point C, it is determined that the differential value indicates parallelism with grid line 108 of the grid, and accordingly, the line from B to C becomes another line element data. In this manner the lines A-B, B-C, C-D, D-E and E-F become a set of line element data.

A standard character dictionary data base 4 used in this invention is fundamentally arranged so as to express one character by using a tracing command, a selection command and a checking command and so on.

Let us assume that the incoming hand-written stroke is converted to a plurality of line element data and stored in the line element data buffer memory 3. Then, the character dictionary data base 4 supplies the command data of its character dictionary to a line element data tracing circuit 5. The line element data tracing circuit 5 utilizes the data elements of the line element data stored in the buffer memory 3, such as the length, the direction and the starting point coordinates to select line element data described by the tracing condition command in the character dictionary which satisfies the tracing condition of the input hand-written stroke, thus generating sub-stroke data of a sub-stroke formed of more than one line element data. A plurality of sub-stroke data which satisfy the tracing condition are generated and these plurality of sub-stroke data are supplied to a sub stroke data selecting circuit 6.

The sub-stroke data selecting circuit 6 receives the sub-stroke data groups derived from the line element data tracing circuit 5 and selects the sub-stroke data which satisfies the selecting condition described by the selection command in the character dictionary data base 4. The sub-stroke data thus selected is supplied to a sub-stroke data buffer memory 7.

A sub-stroke data evaluating circuit 8 receives the selected sub-stroke data stored in the sub stroke data buffer memory 7 and checks the similarity of sub-stroke data in accordance with the contents described by a partial similarity check command derived from the character dictionary data base 4. Further, the sub-stroke data evaluating circuit 8 carries out a total similarity check on the whole of the partial sub-strokes to be checked in accordance with a total similarity check command, and supplies the evaluated result to a character recognition and evaluation circuit 9.

The operation of the line element data tracing circuit 5 will be described next with reference to the flow chart forming FIG. 2. The term "tracing" means to trace the line element data of the hand-written pattern base on the described tracing conditions inherent to each standard character of the character database dictionary 4.

Figure 2:
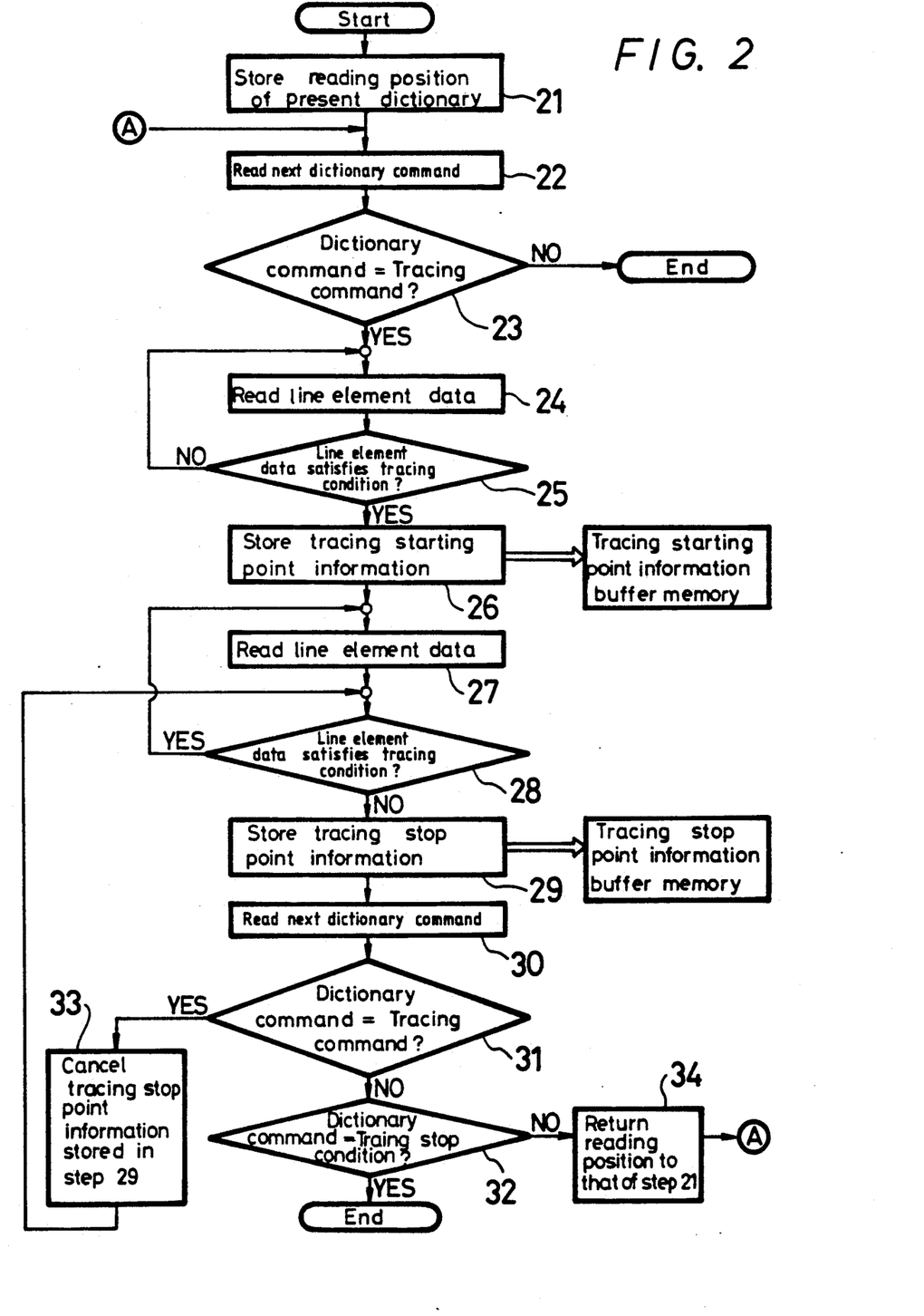
FIG. 2 is a flow chart to which reference will be made in explaining the operation of a line element data tracing circuit used in the present invention.

Referring to FIG. 2, following the Start of the operation, the reading position of the present character dictionary is stored at step 21, and the next dictionary command is read in at step 22. The reading position is actually a pointer for the dictionary data base 4. Namely, each time when a pattern (character) is written by a tablet pen, all character data in the character database are sequentially read out from the dictionary for evaluation. Because each character of the database has a plurality of command sets it is necessary to indicate the readout position of the dictionary.

Next, the routine goes to the decision step 23, in which it is determined whether or not the dictionary command thus read out is the tracing command. If the dictionary command is not the tracing command as represented by a NO at step 23, the routine is ended. In this case, let it be assumed that in the tracing command there are described a tracing condition and a tracing stop condition.

If it is determined that the dictionary command is the tracing command as represented by a YES at step 23, the routine proceeds to step 24, whereat the line element data stored in the line element data buffer memory 3 is read out therefrom. In the next decision step 25, it is determined whether or not the line element data thus read out satisfies the tracing condition of the tracing command. If the line element data does not satisfy the tracing condition as represented by a NO at step 25, the routine returns to the step 24 and the steps 24 and 25 are repeatedly executed. If there is no line element data to be read out under the condition that the line element data does not satisfy the tracing condition, the routine is ended by a proper ending processing.

If, on the other hand, the line element data satisfies the tracing condition as represented by a YES at step 25, the routine proceeds to step 26.

In step 26, the starting point coordinate of the initial line element data, which satisfies the tracing condition, is stored in a tracing starting point information buffer memory as a tracing start point. This buffer memory is assigned in a work RAM (not shown) managed by a microprocessor (not shown).

Further, at steps 27 and 28, the line element data are sequentially read out repeatedly as long as the line element data satisfies the tracing condition. In the next step 29, the tracing stop point data is stored. In this case, in the loop formed of the steps 27 and 28, the starting point information of the line element data next to the final line element data which satisfies the tracing condition is stored in a tracing stop point information buffer memory. Thus, the content of the tracing start point information buffer memory and the content stored in the tracing stop point information buffer memory provide sub-stroke data.

In the next step 30, the next dictionary command is read in and the routine proceeds to the next decision step 31. In decision step 31, it is determined whether or not the next dictionary command is the tracing command. If the dictionary command is the tracing command, as represented by a YES at step 31, the tracing stop point information stored in the buffer memory at step 29 is cancelled at step 33 and the routine returns to step 28. If the next dictionary command is not the tracing command, as represented by a NO at step 31, the routine proceeds to the next decision step 32. In step 32 it is determined whether or not the next dictionary command is the tracing stop condition. If it is determined that the next dictionary command is not the tracing stop condition, as represented by a NO at step 32, the reading position of the character dictionary is changed at step 34 to the same condition as at step 21 and the routine proceeds to step 22.

In the above-mentioned embodiment the tracing operation accepts the multiplexed tracing as described above. If the multiplexed tracing is not needed, the steps 31 and 33 can be emitted. Multiplex tracing can be applied to a sub-stroke having two different tracing conditions. For example, during the character determining process, the character ">" is considered as a single sub-stroke of ">", or two sub-strokes of "-" and "/", and if the character ">" is considered as a single substroke of ">", multiplex tracing is required.

The operation of the sub-stroke data selecting circuit 6 (see FIG. 1) will be described hereinbelow with reference to the flow chart forming FIG. 3.

Figure 3:
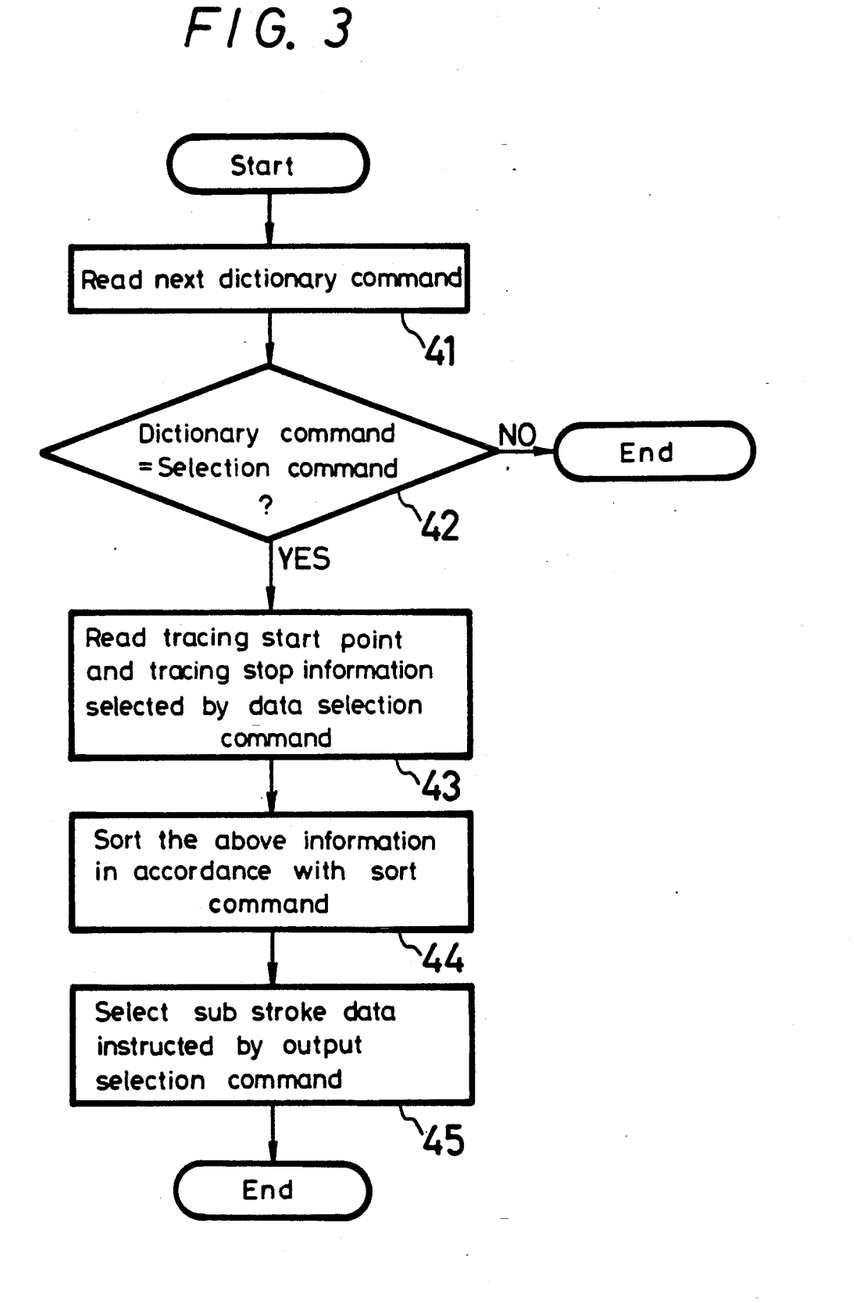
FIG. 3 is a flow chart to which reference will be made in explaining the operation of a sub-stroke data selecting circuit used in the present invention.

Referring to FIG. 3, following the Start of the operation, the next dictionary command is read in at step 41, and the routine proceeds to the next decision step 42. In step 42, it is determined whether or not the dictionary command thus read in is the selection command. If the dictionary command is the selection command, as represented by a YES at step 42, the routine proceeds to step 43. If on the other hand it is determined that the dictionary command is not the selection command, as represented by a NO at step 42, the processing is ended.

In the selection command there are described the data selection command, which indicates the tracing start point and the tracing stop point information used to select the sub-stroke data to be selected, a sort command for re-arranging the sub-stroke data selected and an output selection command which instructs as to the sub stroke data to be derived on the basis of the sorted results.

In step 43, the tracing start point/stop point data of the sub-stroke data instructed by the data selection command are read in, and the routine proceeds to step 44. In step 44, the sub-stroke data thus read in are re-arranged in accordance with the sort command and the sub-stroke data required by the output selection command is selected at step 45. Then, the selected data is stored in the sub-stroke data buffer memory 7 (see FIG. 1) and the processing is ended.

The operation of the sub-stroke data evaluating circuit 8 (see FIG. 1) will be described with reference to the flow chart forming FIG. 4.

Figure 4:
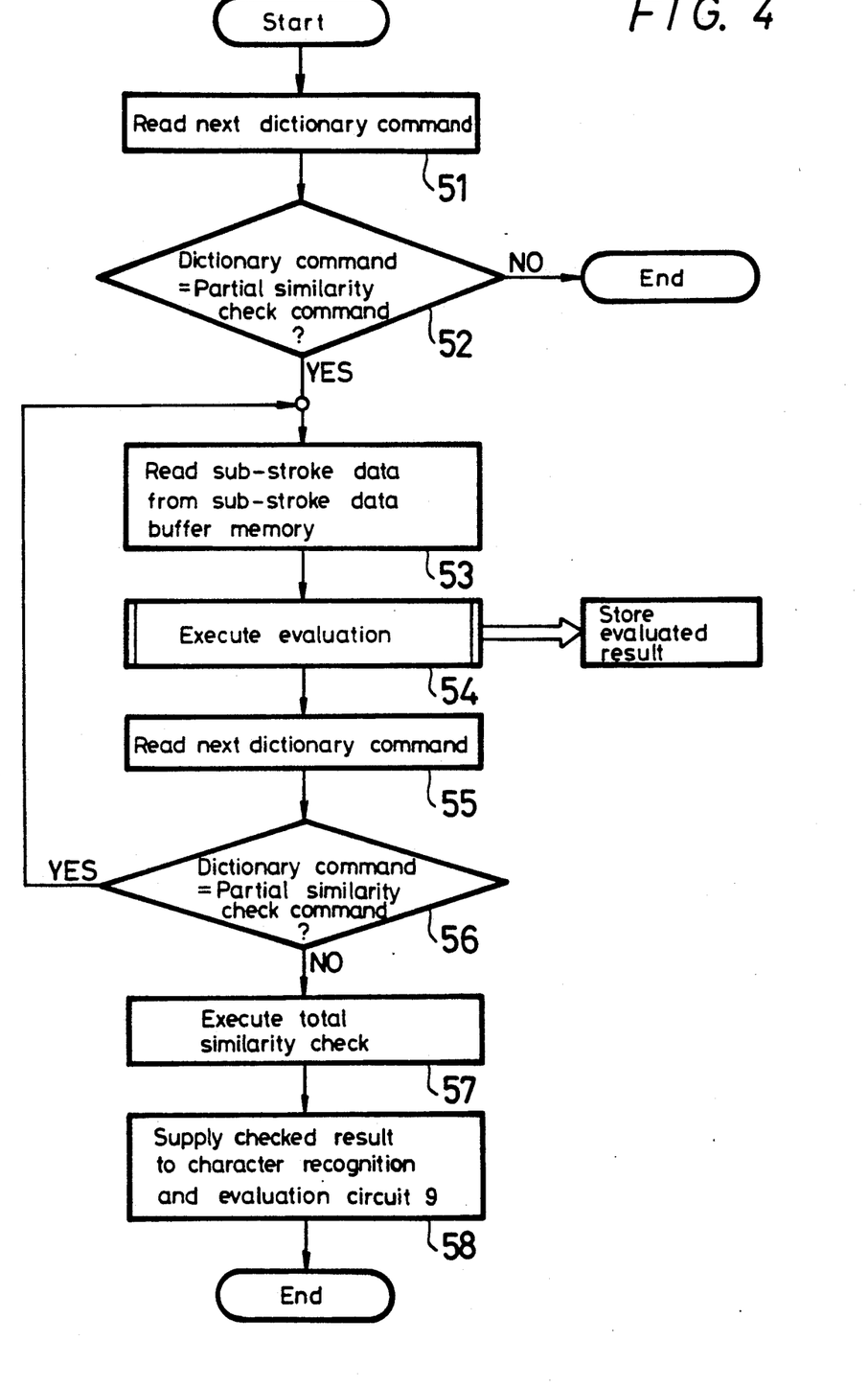
FIG. 4 is a flow chart to which reference will be made in explaining the operation of a sub-stroke data evaluating circuit used in the present invention.

Referring to FIG. 4, following the Start of the operation, in step 51, the next dictionary command is read in. In the next decision step 52, it is determined whether or not the dictionary command thus read in is a partial similarity check command. If it is determined that the dictionary command is a partial similarity check command, as represented by a YES at step 52, the routine proceeds to step 53. In step 53, the sub-stroke data is read in from the sub-stroke data buffer memory 7 (see FIG. 1). If on the other hand it is determined that the dictionary command is not a partial similarity check command, as represented by a NO at step 52, the processing is ended. In the partial similarity check command there is described partial similarity check processing data simultaneously, so that in the partial similarity check processing at step 54, the sub-stroke data thus read in is processed in accordance with the partial similarity check processing data and then the evaluated result is stored. Partial similarity checking can be explained as follows. Each character is comprised of a plurality of sub-strokes. In order to improve the recognition speed of the system, hand-written strokes of each character are divided into two or three or more groups of sub-strokes. If a partial similarity check for the first group does not exceed a certain level, the recognition process for the rest of the groups is of no use, so that the recognition process shifts to the next character of the character database.

In the next step 55, the next dictionary command is read in, and the routine proceeds to the next decision step 56. In decision step 56, it is determined whether or not the next dictionary command is a partial similarity check command. If it is determined that the next dictionary command is a partial similarity check command, as represented by a YES at step 56, the routine returns to step 53. If on the other hand it is determined that the next dictionary command is not a partial similarity check command, as represented by a NO at step 56, the routine proceeds to step 57. If the content of the next dictionary command is a total similarity check command, the checked results derived from the processing loop formed of steps 53 to 56 are totally checked together, then at step 57, the total similarity check processing for the respective sub-stroke data stored at step 54 is executed. In the next step 58, the totally checked result is evaluated and fed to the character recognition and evaluation circuit 9 (see FIG. 1). Then, the operation is ended.

As described above, all character data in the character dictionary base 4 are sequentially checked for one hand-written character and attached with evaluated values and the character code attached with the best evaluation point is selected as the hand-written character.

In FIG. 1 the block outlined by a one-dot chain line shows the circuit elements which constitute a template type recognition circuit using template data. While this recognition circuit itself is not directly related to the elements of the present invention, it becomes considerably advantageous from a recognition speed standpoint. This type of character recognition circuit will be described with reference to FIG. 1.

As shown in FIG. 1, the dot data for a hand-written stroke from the hand-written character input circuit 1 is converted to the line element data by the input dot data for hand-written stoke/line element data converting circuit 2, and is then stored in the line element data buffer memory 3. Further, the line element data stored in the line element data buffer memory 3 is converted to template data by a line element data/template data converting circuit 11 and is then stored in a template data buffer memory 12. In the template data there is described the shape of dot for line element data corresponding to a single hand-written stroke (sometimes double hand-written strokes or more).

When the template data derived from the template data buffer memory 12 is supplied to a template data evaluating circuit 13, this circuit sequentially receives character dictionary template data from the character dictionary data base 4 and compares the hand-written template data with the content described in the character dictionary template data. Then, the template data evaluating circuit 13 supplies the evaluated result to the character recognition and evaluation circuit 9. In this case, the template data describes the typical shape of the dot for line element data corresponding to the single hand-written stroke and the data amount of the dictionary thereof is small as compared with the line element data tracing type dictionary. Therefore, the recognition speed of this recognition circuit can be increased with ease as compared with the aforementioned recognition circuit formed of the circuit blocks 5 to 8 using the line element data. On the other hand, this template type of recognition circuit has a disadvantage in that it is not effective for recognizing distorted hand-written characters such as continuously written character and so on.

In order to accept distorted hand-written characters in this template system, it is proposed that the whole possible shapes of strokes written by the single hand-written stroke as template data have to be stored, or the continuously hand-written stroke is cut in accordance with a certain rule to describe the cut-out sub-strokes as the combination of the fundamental template data. But these methods are both not advantageous from a processing speed standpoint. On the other hand, the recognition circuit formed of the circuit elements 5 to 8 utilizes the line element data whose amount is larger than that of the template so that it is not advantageous from a recognition speed standpoint but instead is more powerful with respect to continuous and distorted characters.

If both of the character recognition circuits having complementary features are combined in use wherein the recognition circuit using the template data as its input is driven to recognize a character having a comparatively small distorted portion and the character recognition circuit formed of the circuit elements 5 to 8 using the line element data as the input thereof is employed to recognize a character having a large distorted portion, then it is possible to increase the character recognition ability.

Let us now consider the arrangement formed of the combination of both of the character recognition circuits as shown in FIG. 1.

Referring to FIG. 1, the character dictionary data base 4 utilizes a control code attached to each of the character data and described in the character dictionary to determine which of the template data evaluating circuit 13 using the template data stored in the template buffer memory 12 and the evaluating circuit formed of the circuit elements 5 to 8 using the line element data stored in the line element data buffer memory 3 should be used. Then, the character dictionary data base 4 supplies the contents of the character dictionary to the evaluating circuits (circuit groups) selected by the control code described in the character dictionary and one of the circuits (circuit groups) is selected to execute the processing.

The processings shown in FIGS. 2 to 4 will be explained hereinbelow in conjunction with the embodiment of the present invention. In this case, let us assume that the line element data converted from the input dot data for the hand-written stroke by the input dot data for hand-written stroke/line element data converting circuit 2 includes information such as length, direction, coordinates of the starting point and the condition of the tablet pen (up and down of the tablet pen). Further, the line element data includes size data of the configuration of the character and the maximum and minimum coordinate values in the horizontal and vertical directions of the input hand-written stroke. Furthermore, let it be assumed that the circuits 5 to 8 using the line element data as shown in FIG. 1 are selected by the control code of the character dictionary data base 4. The recognition operation for recognizing an input hand-written stroke of a so-called "Ennyo" which forms one radical of a Chinese character will be described with reference to FIGS. 5A to 5D. Throughout FIGS. 5A to 5C, the block shown by a one dot chain line represents a square character writing area defined on the tablet.

For the input hand-written stroke, it is assumed that the tracing command, the tracing condition and the tracing stop command stored in the character dictionary for recognizing an "Ennyo" character are described as follows.

(I) Tracing command

The tracing command is described to trace the succeeding line element data from the present line element data taken as the tracing start point.

(II) Tracing condition command

The tracing condition command is described to trace the line element data if it is directed rightwardly regardless of the condition of the tablet pen. (III) Tracing stop condition command The tracing stop condition command is described to stop the tracing when there are conditions that the hand-written stroke is near the right end portion of the writing area or the pen-up condition appears twice.

Figure 5A:
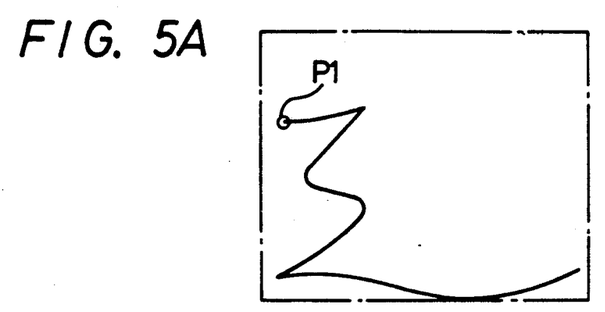
FIGS. 5A to 5D are schematic views used to explain the hand-written character recognition process of the present invention, respectively.
Figure 5B:
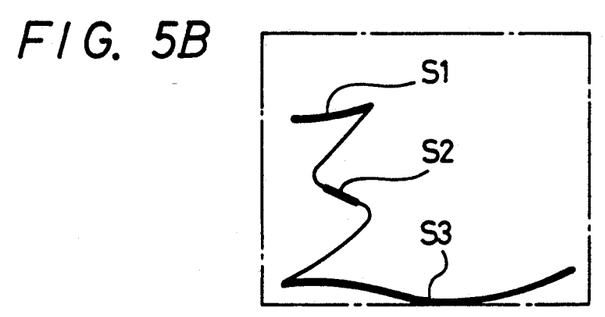

If the tracing start point is located at a point P1 as shown in FIG. 5A, then three hand-written sub-strokes S1, S2 and S3 which can satisfy the above-mentioned conditions are obtained as a result of the tracing done by using the above-mentioned tracing command as shown by the three bold line portions in FIG. 5B.

In this case, let it be assumed that for each of the three hand-written sub-strokes S1, S2 and S3 obtained by the tracing processing selection command, that the selecting condition command, sort command and output selection command stored in the character dictionary for the selection processing for the "Ennyo" character are described as follows:

(i) Selection command

The selection command is described to execute the processing in accordance with the following commands, thereby selecting the hand-written sub-stroke.

(ii) Selection condition command

The selection condition command is described to select, from the hand-written sub-stroke, for example S3, obtained in the immediately-preceding tracing processing, the hand-written sub-stroke whose starting point is located near the lower left portion of the square writing area and whose stop point is located near the lower right portion of the square writing area.

(iii) Sort command

The sort command is described to sequentially sort the hand-written sub-strokes selected by the selection condition command in accordance with their lengths.

(iv) Output selection command

The output selection command is described to select the longest hand-written sub-stroke from the hand-written sub-strokes which are selected by the selecting condition command and which are further sorted by the sort command.

Figure 5C:
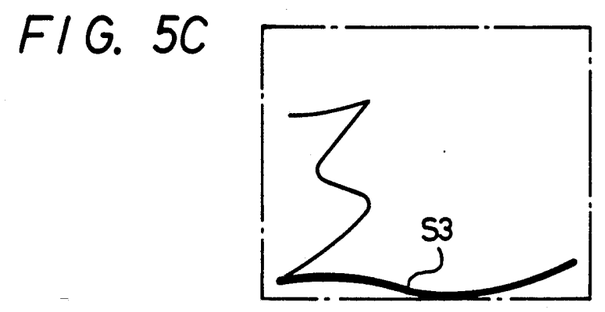

When the hand-written sub-strokes are selected by the above-mentioned selection command, the sub-stroke S3, shown by a bold line portion in FIG. 5C, is obtained.

Figure 5D:
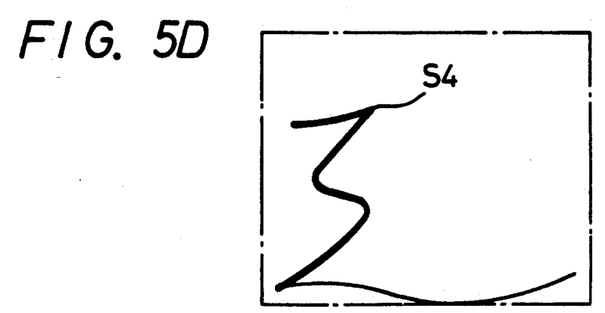

Further, the tracing and selection under different conditions for the "Ennyo" character are carried out in accordance with the dictionary command for the "Ennyo" character. Then, a hand written sub-stroke S4 by a bold line portion in FIG. 5D is obtained by similar processing.

The hand-written sub-strokes S3 and S4 obtained by the above-mentioned tracing and selection operations are sequentially stored in the sub-stroke data buffer memory 7 shown in FIG. 1 and are supplied to the sub-stroke data evaluating circuit 8, in which they are processed by the partial similarity check command of the character dictionary data base 4.

Then, the hand-written sub-strokes S3 and S4 undergo the partial similarity check. In this case, as the partial similarity check command, the shape evaluation command and the position evaluation command for the "Ennyo" character are described as follows.

A. Partial similarity check command

The partial similarity check command is described to check the partial similarity of the hand-written sub-strokes S3 and S4 in accordance with the contents described by the shape evaluation command and the position evaluation command.

B. Shape evaluation command

The configuration of the hand-written sub-stroke S4 is rectangular and is relatively long in the longitudinal direction. The starting point thereof is located above its stop point. The real length of the hand-written sub-stroke S4 may be comparatively long as compared with the vertical length of the polygon formed by the hand-written sub-stroke S4 only.

The configuration of the hand-written sub-stroke S3 is rectangular and is considerably long in the horizontal direction. The horizontal length of the polygon formed only by the hand-written sub-stroke S3 is substantially equal to the real length of the hand-written sub-stroke S3.

C. Position evaluation command

The stop point of the hand-written sub-stroke S4 is located near the starting point of the hand-written sub-stroke S3.

As a total check command for collectively checking the results checked by the above-mentioned items B and C, the total similarity check command and the total similarity check execute a command for the "Ennyo" character and are described as follows.

(1) Total similarity check command

The total similarity of the immediately-preceding evaluated results is checked by using this total similarity check command.

(2) Total similarity check execute command

The total similarity check execute command is described to collectively evaluate the respective evaluated results as a total similarity check result.

According to the above-mentioned processing, it is determined whether the input hand-written stroke is identical with the "Ennyo" character or not. Alternatively, the degree of similarity between the "Ennyo" character and the input hand-written stroke is determined, and the checked result is supplied to the character recognition and evaluation circuit 9 shown in FIG. 1. Of course, all character data in the dictionary is compared with each of the hand-written characters.

When the input the "Ennyo" character is checked in accordance with the commands expressing the "Ennyo" character stored in the character dictionary data base 4, it is possible to obtain the highest evaluation point. In this case, however, when the input hand-written stroke of the "Ennyo" character is considerably distorted, even if the above the "Ennyo" character is checked in accordance with the commands for expressing the "Ennyo" character stored in the character dictionary data base 4, the evaluation point thus obtained is not so high. In such case, it is regarded that the input hand-written stroke of the "Ennyo" character cannot be recognized, and the processing is ended.

The character recognition and evaluation circuit 9 functions to sequentially store evaluation results for all of the character dictionary data base relative to the hand-written pattern. After all of the results are stored, the character code having the best results is derived as a result of the recognition process. Usually around ten or so character codes must be stored with evaluation points and the rest of the characters in the character database do not need to be stored because the level of similarity with the hand-written character data does not reach a predetermined level.

According to the present invention, as described above, we have considered the importance of sub-strokes strokes when examining a hand-written stroke from the standpoint of an original character or the standpoint of a character that can be described. Secondly, we have discovered that the hand-written stroke is a set of sub-strokes or that sub-strokes are elements which constitute the hand-written stroke. Finally, we have succeeded in grasping the character on the basis of the original shape of the elements and the positional relationship among the elements. Thus, unlike the prior-art which requires a relatively large amount of calculation processing, the hand-written character recognition apparatus of the present invention can recognize the continuous and distorted characters with ease.

Further, when a hand-written character is recognized by using template data in which a single hand-written stroke is represented as a typical, simplified shape, to store much more typical shapes is not advantageous from a recognition speed standpoint. Further, although the employment of only a template data processing system causes the processing speed to be increased such a system cannot be applied to recognize distorted characters. According to the present invention, since the template data processing system and the sub-stroke dividing processing system are properly selected, it is possible to obtain a hand-written character recognition apparatus which is powerful for the recognition of distorted characters and which is high in recognition speed.

It should be understood that the above description is presented by way of example of a single preferred embodiment of the invention and it will be apparent that many modifications and variations thereof could be effected by one skilled in the art without departing from the spirit and scope of the novel concepts of the invention so that the scope of the invention should be determined only by the appended claims.

We claim:

1. A hand-written character recognition apparatus comprising:

means for receiving dot data obtained when writing a character and for generating corresponding line element data therefrom;

character dictionary data base means which stores character data as command instruction sets each expressing the configuration of a different character, the character data including tracing commands for extracting sub-stroke data from the line element data, sub-stroke data selecting commands for selecting one or more sub-stroke data for later evaluation processing, and checking commands for partially evaluating the thus selected one or more sub-stroke data by making a comparison to a partial shape of a standard character, and for totally evaluating the hand-written character by comparing it to the standard character;

sub-stroke data generating means connected to the character dictionary data base means for receiving the tracing commands and generating sub-stroke data by tracing the line element data based on the tracing commands inherent to each standard character derived from the character dictionary data base means;

sub-stroke data selecting means connected to the character dictionary data base means for receiving the character selection commands and supplied with the thus generated sub-stroke data for selecting sub-stroke data inherent to each standard character based on the sub-stroke data selecting commands; and sub-stroke data evaluating means connected to the sub-stroke data selecting means and the character dictionary data means, so as to receive character checking commands, for evaluating partial similarity of the selected sub-stroke data compared to a partial sub-stroke data of the standard character, and for evaluating the total similarity of the hand-written character based on the results of the evaluation of the partial similarity.

2. A hand-written character recognition apparatus as recited in claim 1, wherein the sub-stroke data selecting commands include a selecting condition command, storing commands, and output selecting commands, and further comprising a buffer memory connected to the sub-stroke data selecting means for storing selected sub-stroke data satisfying the selecting condition commands.

3. A hand-written character recognition apparatus as recited in claim 2, wherein the character checking commands include partial checking commands and total checking commands, and wherein the sub-stroke data evaluating means receives the partial checking commands and generates a partial evaluation and receives the total checking command and, using the results of the partial evaluation, generates a final evaluation of the written character relative to the character data stored in the character dictionary data base means.

4. A hand-written character recognition apparatus as recited in claim 3, wherein the character checking commands include shape evaluation commands and positional evaluation commands and wherein the sub-stroke data selecting means receives the shape evaluation commands and evaluates the shape of the selected sub-stroke data of the written character compared to the shape of the standard character and receives the positional evaluation commands and evaluates the positional relation of the selected sub-stroke data of the written character compared to the positional relations of the sub-stroke data of the standard character.

5. A hand-written character recognition method comprising the steps of:

receiving dot data obtained when writing a character and generating corresponding line element data therefrom;

storing character data in a character dictionary data base memory as command sets each expressing the configuration of a different standard character, the character data including tracing commands for extracting sub-stroke data from the line element data, sub-stroke data selecting commands for selecting one or more su-stroke data for later evaluation processing, and checking commands for partially evaluating the thus selected one or more sub-stroke data by making a comparison to a partial shape of a standard character, and for totally evaluating the hand-written character by comparing it to the standard character;

generating sub-stroke data by tracing the line element data based on the tracing commands inherent to each standard character derived from the character dictionary data base memory;

selecting sub-stroke data inherent to each standard character based on the sub-stroke data selecting commands; and evaluating partial similarity of the selected sub-stroke data compared to a partial sub-stroke data of the standard character, and for evaluating the total similarity of the hand-written character compared to the shape of the standard character based on the results of the evaluation of the partial similarity.

6. A hand-written character recognition method as recited in claim 5, wherein the sub-stroke data selecting commands include a selecting condition command, storing commands, and output selecting commands, and further comprising the step of storing in a buffer memory selected sub-stroke data satisfying the selecting condition commands.

7. A hand-written character recognition method as recited in claim 6, wherein the character checking commands include shape evaluation commands and positional evaluation commands, and further comprising the steps of evaluating the shape of the selected sub-stroke data of the written character compared to the shape of the standard character and evaluating the positional relation of the selected sub-stroke data of the written character compared to the positional relations of the sub-stroke data of the standard character.

8. A hand-written character recognition method as recited in claim 7, wherein the character checking commands derived from the character dictionary data base memory include a partial checking command and a total checking command, and further comprising the step of using the partial checking command to partially evaluate the written character relative to the stored character data and using the total checking command to generate a final evaluation of the written character relative to the stored characters based on results of the partial evaluation step.

* * * * *